July 26, 1932.　　　　B. P. SCHILTZ　　　　1,868,721

TOOL DRIVING MECHANISM FOR TAPPING MACHINES OR THE LIKE

Filed July 8, 1929　　4 Sheets-Sheet 1

Inventor

Bernard P. Schiltz

By Bates, Golick & Jease

Attorney

July 26, 1932.  B. P. SCHILTZ  1,868,721

TOOL DRIVING MECHANISM FOR TAPPING MACHINES OR THE LIKE

Filed July 8, 1929  4 Sheets-Sheet 2

Inventor
Bernard P. Schiltz
By Bates, Golrick & Teare
Attorney

July 26, 1932. B. P. SCHILTZ 1,868,721
TOOL DRIVING MECHANISM FOR TAPPING MACHINES OR THE LIKE
Filed July 8, 1929 4 Sheets-Sheet 3

Inventor
Bernard P. Schiltz
By Bates, Gobrick & Teare
Attorney

Patented July 26, 1932

1,868,721

UNITED STATES PATENT OFFICE

BERNARD P. SCHILTZ, OF CLEVELAND, OHIO, ASSIGNOR TO THE FOOTE-BURT COMPANY, OF CLEVELAND, OHIO, A CORPORATION OF OHIO

TOOL DRIVING MECHANISM FOR TAPPING MACHINES OR THE LIKE

Application filed July 8, 1929. Serial No. 376,648.

This invention concerns automatic metal cutting machinery, and particularly a tool driving arrangement for a tap or like metal cutting tool. The general object is to provide a holder or chuck mechanism adapted to intermittently engage the tool to turn the same, which mechanism will be so arranged that the danger of tool breakage and distortion will be practically eliminated.

A specific object is to provide a tap chuck for an automatic machine wherein the tap is automatically engaged and disengaged by the chuck, by which such engagement and disengagement may be effected without shock to the machine and/or tap breakage.

A feature of the invention is that the tool chuck or holder which is adapted to intermittently engage the tool, has a yielding torque takeup device permitting the full engagement of the chuck or holder with the tool before the tool is caused to begin its work.

Further objects include the provision of a more simplified and efficiently operating tool driving mechanism adapted for use on a tapping machine of the type shown and described in the prior patent to Daniel Kelleher, No. 1,645,285, issued October 11, 1927.

Other objects and features of the invention will become apparent from the following description relating to the accompanying drawings. The essential novel characteristics will be summarized in the claims.

Figure 1:
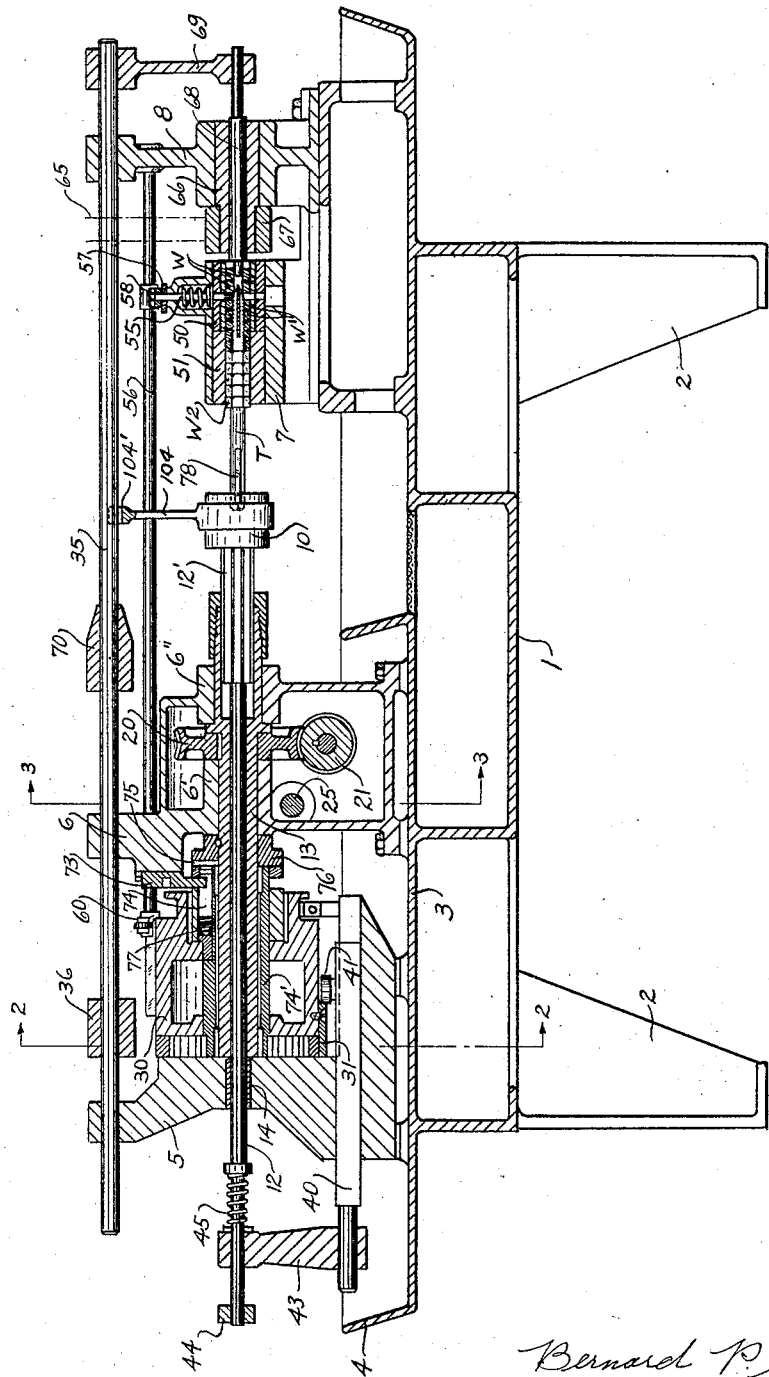
Figure 2:
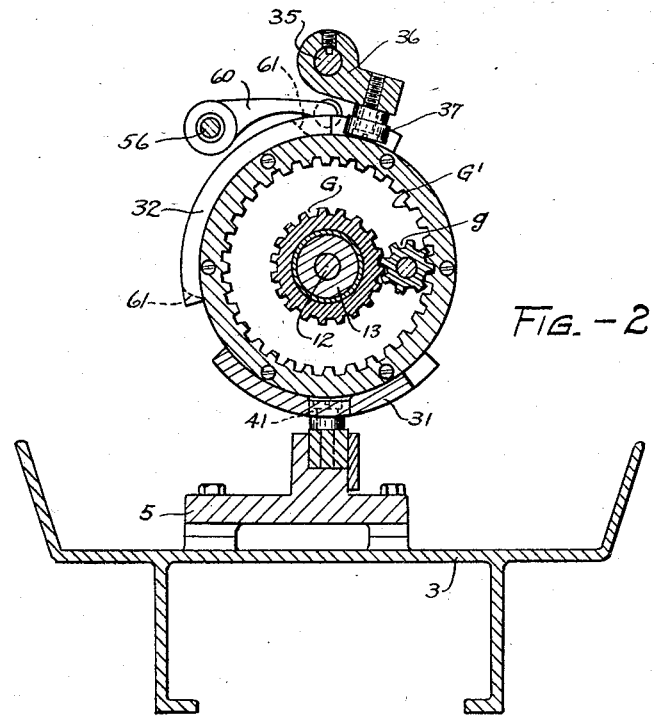
Figure 3:
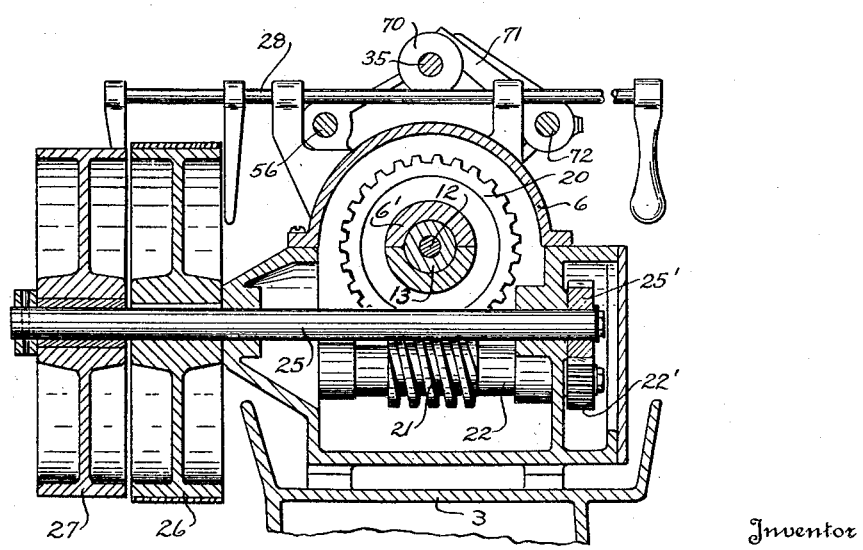
Figure 4:
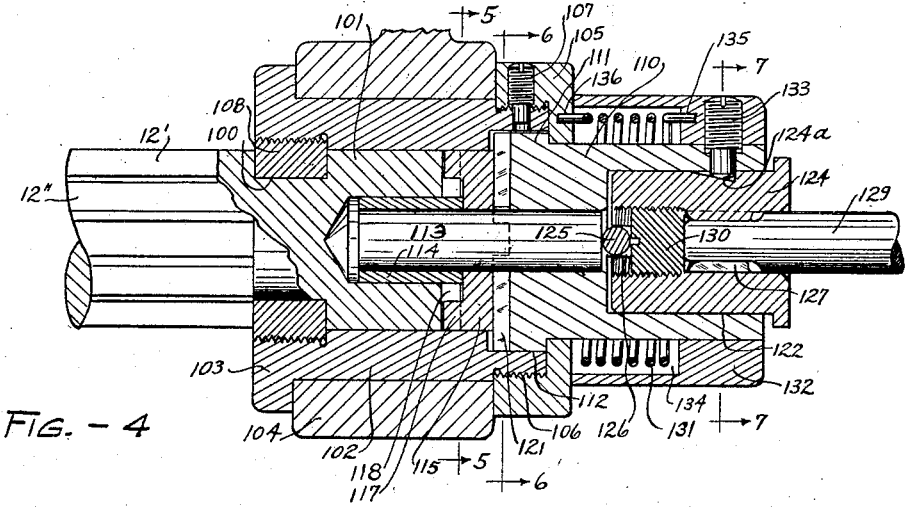
Figure 5:
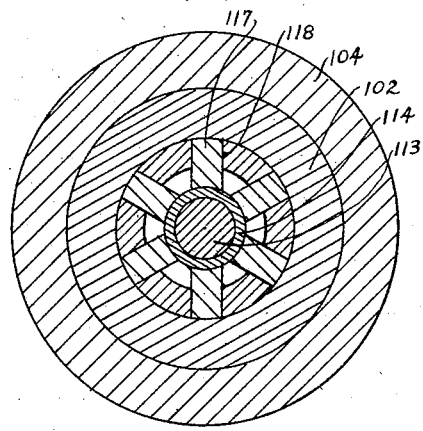
Figure 6:
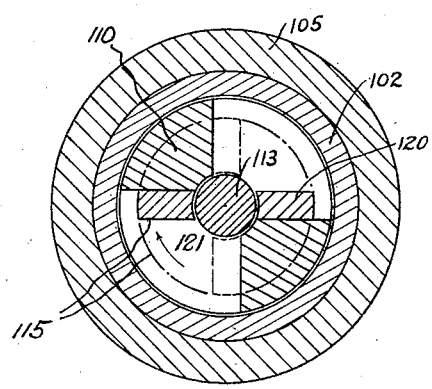
Figure 7:
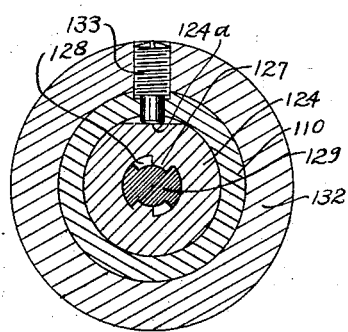
Figure 8:
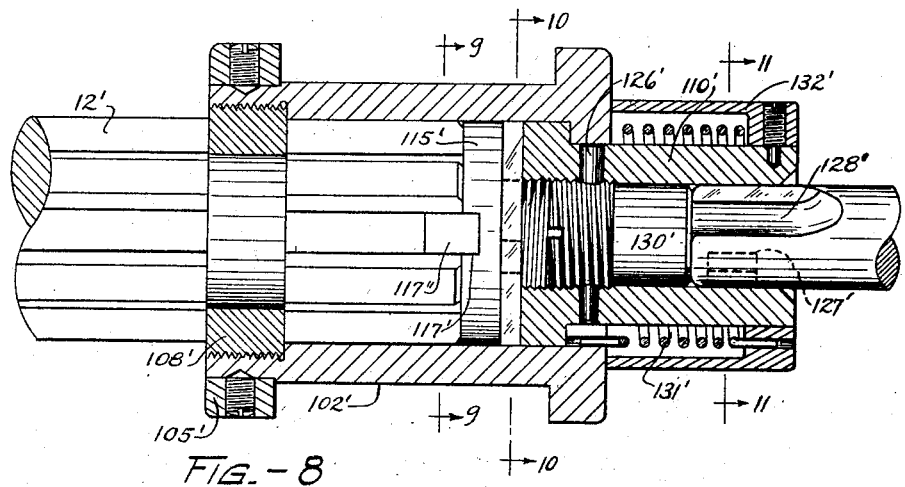
Figure 9:
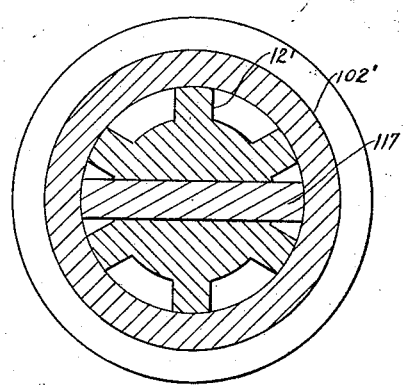
Figure 10:
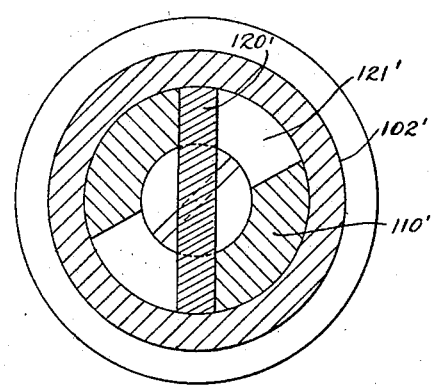
Figure 11:
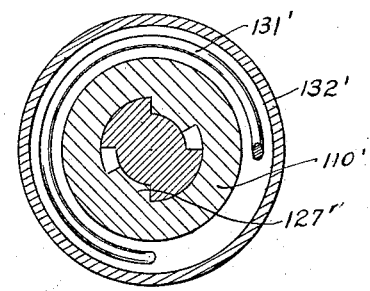

In the drawings, Fig. 1 is a substantially central longitudinal cross sectional view of a suitable machine on which my invention is adapted to be used; Figs. 2 and 3 are transverse cross sectional views of the machine as indicated by the corresponding section indicating lines on Fig. 1; Fig. 4 is a central longitudinal cross sectional view through a preferred form of the tool chuck and driving mechanism; Figs. 5, 6 and 7 are transverse cross sectional views in accordance with the corresponding section indicating lines on Fig. 4; Fig. 8 is a view similar to Fig. 4 showing a modified construction, and Figs. 9, 10 and 11 are transverse cross sectional views of the modification, taken substantially along the corresponding section indicating lines on Fig. 8.

The tapping machine of Figs. 1, 2 and 3 is substantially in accordance with the Kelleher patent above referred to and may comprise a suitable base member 1 provided with supporting legs 2, the base or bed being formed as by reason of a floor portion 3 and connected side walls or flange formations 4 to provide an oil pan and supporting arrangements for the essential tapping mechanisms. The tapping mechanisms may be supported on upright standards or brackets rising from the floor portion 3, there being spindle head and driving mechanism supporting brackets 5 and 6 at the head of the machine and work holding and feeding mechanism supporting brackets 7 and 8 at the opposite end of the machine.

Work is fed successively into suitable work holding devices within the bracket arrangement 7 for operation thereon by a rotatable tool T, shown as a threaded tap. The tap is alternately engaged and disengaged by a chuck arrangement, generally indicated at 10, which is constantly driven by the spindle mechanism supported in the brackets 5 and 6 and including a central chuck driving or spindle shaft 12. The arrangement is such that the shaft 12 rotates continuously and its operation, as well as that of the work holding and feeding mechanism are all under the control of a master cam arrangement, which will be presently described.

The central spindle 12 is supported in part and is driven by a spindle sleeve 13 which has suitable bearings in hub-like formations 6' and 6" in the bracket 6. Additional support for both the shaft 12 and the sleeve 13 is provided by a bearing 14 in the bracket 5, embracing the head end of the shaft 12.

For driving the spindle 13, a worm gear 20 may be keyed onto the sleeve between the hub formation 6' and 6" and the worm gear may be suitably driven by a worm 21 on a transversely extending worm shaft 22, supported beneath the worm gear in suitable bearings in the bracket formation 6. The shaft, as shown, is arranged to be turned by a spur gear 22' meshing with a similar spur gear 25' on a transverse shaft 25. The shaft 25 has fast and loose pulleys at 26 and 27 respectively, disposed at one side of the machine. The shaft may be driven from a belt arranged to be shifted by suitable shifting mechanism, generally designated 28, from one pulley to another.

The spindle sleeve 13 is arranged to be intermittently connected to the main control element 30 of the cam drum mechanism, previously mentioned, and which operates to shift the spindle shaft 12 and its chuck mechanism 10 in coordinated relation to the work feeding mechanism which is also controlled by the cam. The drum is driven slower than the sleeve by reason of gearing including an external gear G on the sleeve, an internal gear G' on the drum and a connecting idler $g$ (Fig. 2).

The cam (see Figs. 1 and 2) has arcuate cam plates 31 and 32 which act alternately on a master control bar 35 through a cam follower arm 36 provided with a roller 37 for engaging the inclined faces of the cams. The control bar 35 extends throughout substantially the entire length of the machine in order to operate the work feeding mechanism, to be hereinafter described, as well as to operate to connect and disconnect the drum 30 and spindle sleeve 13. Upon each rotation of the cam drum, the inclined face of one of the cams moves the bar 35 to the left, as shown in Fig. 1, which movement feeds work into the work holding mechanism associated with the bracket formation 7 and during part of the same rotation, the face of the other cam feeds the bar to the right, in order to prepare for feeding new work to the work holder.

During such rotation of the cam drum, the spindle 12 is also shifted longitudinally of the machine in order to cause the chuck mechanism 10 to engage and disengage the tap. The connection from the drum to the spindle shaft 12 comprises a slide bar 40, mounted in a suitable guiding recess in the bracket formation 5 and carrying an upwardly facing roller 41 which is engaged by the cams 31 and 32 in sequence. One cam, namely that shown at 31, operates to shift the bar 40 to the right, and the other, namely 32, to the left, as shown in Fig. 1. The operative connection from the bar 40 to the spindle 12 may comprise a cross arm 43 secured to the bar 40 and extending upwardly into slidingly embracing relation to the outwardly projecting end of the shaft 12. The upper end of the arm 43, as shown, acts against a fixed abutment 44 on the shaft 12 to positively withdraw the chuck from the tap, and against a yielding abutment 45 to replace the chuck on the tap and to thereafter urge the tap toward the work to cause it to start tapping and to assist in feeding.

A cycle of operation of the machine shown comprises a suitable number of rotations of the spindle to perform a complete threading operation on a predetermined number of blanks in the holder mechanism, followed by a single rotation of the cam drum. This rotation of the drum results in withdrawing the chuck mechanism 10 from the tap; discharging completed work from the machine over the thus disengaged end of the tap; shifting the tap with work thereon and meanwhile feeding new work to tapping position, securing the new work against longitudinal movement relative to the tap, and finally causing the chuck to reengage the tap and at the same time throwing out a clutch and thereby disconnecting the drum from the driving sleeve 13 and allowing it to stop. The initiation of this cycle of operation may be controlled entirely by the advancing movement of the tap. The work positioning and holding, and work discharging mechanism is as follows, as illustrated.

Suitably supported in the bracket 7 are two centrally bored work holding and guiding fixtures 50 and 51. The bores are aligned and may be of such shape as to hold the work, shown as a series of hexagonal nuts, against rotation relative to the fixtures and machine in general. Work which has just been fed into the fixture 50 is indicated at W. This work is in what may be called "start tapping" position. At the left of this position are additional pieces of work which have been tapped, and some of which pieces are still on the threads of the tap as at W1. To the left of the pieces at W1 are completely tapped pieces (position W2) which are on the smooth shank of the tap and therefore capable of being stripped from the tap when the latter is disengaged by the chuck.

The fixture at 50 is provided with a plunger arrangement, including a spring pressed plunger member 55 shown as in position between the work at W and at W1. This plunger is adapted to be withdrawn from engagement with the pieces, once for each cycle of operation of the machine, to allow the blanks at position W to be moved past the plunger to the position W1. The plunger may be operated by a rock shaft 56 having a rock arm 57 connected with the head 58 of the plunger member 55, the shaft being also provided with a cam follower arm 60 (Fig. 2) for engagement with a cam 61 on the drum 30.

The fixture at 50 may also be provided with suitable spring latches, not shown, at the right of the blanks at W so as to hold the two blanks in the position W, against movement away from the tap, during the tapping operation thereon.

The blank supply may comprise a suitable hopper, not shown, and a raceway shown diagrammatically at 65 which leads to the interior of a tubular fixture 66 supported in the bracket 8, this fixture and the adjacent supporting part 67 therefor being laterally recessed to allow the work to pass into the bore of the fixture 66 into substantial alignment with the tap. The lateral recess is not illustrated.

The bore of the fixture 66 guides a work feeding plunger 68 which has one end, namely that at the left in Fig. 1, arranged to engage pieces of work which may fall into the central bore of the fixture on withdrawal of the plunger, and to convey them to the position W in the fixture 50. Suitable means for operating the bar 68 may comprise a cross arm 69 which connects the outwardly projecting end of the bar to the main control bar or rod 35.

In operation, assuming the tap T is being rotated by the spindle mechanism and chuck device 10, the threaded end of the tap will cut threads on the work at W and finally push the bar 68 ahead of it out of the position shown in Fig. 1 and to the right. This operation results in moving the bar 35 to the right carrying with it a conical cam member 70 thereon, to cause it to engage an arm 71 (Fig. 3) on a rock shaft 72. The rock shaft has a connection, not shown, with a clutch control slide member 73 (Fig. 1) mounted for vertical reciprocation in the bracket formation 6. The slide has its lower end arranged to disengage a key 74, in a mounting 74' rigid with the gear G, to allow the key to make connection between the spindle sleeve 13 and the cam drum driving gearing so that the cam drum may be picked up and rotated by the sleeve. The connection includes a suitable number of teeth 75 in a hub-like formation 76 rigid on the sleeve, the key 74 being pushed into engagement with the teeth by a suitable spring 77 whenever the slide 73 is raised. The cycle is now completed by the rotation of the drum, the drum first operating by reason of the cam 61 to withdraw the plunger member 55 out of its position between adjacent blanks; then, through the agency of the cam members 31 and 32, to cause the chuck member 10 to disengage the tap, meanwhile ejecting completed work as by means of claw fingers 78 (Fig. 1) mounted on the chuck device 10; to cause the feeding of new work to the position W and to carry the tap back toward the chuck ahead of such new work; then to cause the replacement of the plunger between adjacent pieces (position shown in Fig. 1), and finally to cause the spindle to move the chuck into engagement with the tap substantially at the time the key 74 is withdrawn from its then engaged tooth 75 to disconnect the drum 30 from the sleeve 13.

Obviously, when the rotating chuck comes into engagement with the non-rotating tap, there is ordinarily more or less danger of breaking the tap by the sudden engagement thereof, particularly since the tap is caused to rotate just as soon as a partial engagement between the chuck and tap is effected. By way of example, if the chuck has its tap engaging formation substantially complementary to the driving formations on the tap, the driving formations will naturally engage to cause the tap to be turned before there is a full engagement, and this tends to damage both the tap and chuck. The engaging surfaces are ordinarily deformed and there is also danger of snapping off the tap. There are other difficulties presented, particularly where the chuck must be withdrawn from the tap while both are rotated. Ordinarily there is considerable friction to overcome in disengaging the tap and this friction increases when the engaging parts of the chuck and tap become worn or deformed.

The invention contemplates eliminating the above mentioned difficulties as will now be shown in connection with Figs. 4 to 11.

Two forms of chuck devices are shown. In both forms, there is a chuck element for direct engagement with the tool and another chuck element which may rotate within definite limits with reference to the first, and which second mentioned element may be constantly rotated by the spindle. The number of elements between the tool and spindle may be increased or diminished, depending largely on the character of the work performed and the character and size of the tool. The preferred arrangement is shown in Figs. 4 to 7.

In Fig. 4, I have shown the enlarged splined end 12' of the spindle shaft 12 circumferentially channeled as at 100, beyond which, from the spindle head, there is an enlargement 101. The enlargement carries a collar member 102 which is made in two parts 103 and 105 threaded together at 106 and which may be positively secured against relative rotation as by a threaded pin 107. The collar member 103 is held onto the shaft 12 by reason of a split ring 108, made in two halves, and which is tightly threaded into the spindle head end of the collar part 103 and bears tightly in the channel 100 of the shaft 12. The reduced portion of the collar 102 carries an arm member 104, the purpose of which is to carry the work stripping claw members 78 previously mentioned, and one of which is illustrated in Fig. 1. The arm may be held against rotation by reason of having its upper end 104' in loose embracing relation to the main control bar 35.

Suitably supported in the member 102 is a chuck holder member 110. The chuck holder is preferably substantially cylindrical in shape and has an enlarged head 111 riding in a circular channel 112 formed between the small portion of the collar 103 and the ring 105. Additional support may be provided for the holder 110 as by means of a pilot bar 113 which may be tightly fitted in the central bore of the holder member 110 and which projects toward the spindle head into the embrace of a bearing of any suitable form, shown, as a bushing 114 seated in a suitable central recess in the end of the spindle shaft. The bar assists in preserving the axial alignment of the essential chuck elements and the spindle shaft.

The holder member 110 is limited in its turning movement relative to the shaft 12 and its supporting parts, above described, by reason of a disc-like key member 115, seated between the end of the shaft 12 and the holder member 110 and having oppositely and longitudinally extending key formations respectively engaging the adjacent ends of the shaft and the holder 110. The key formations at 117 may engage the spline channel formations 12″ snugly so that the key member is non-rotatable relative to the spindle shaft. As shown, however, the end of the shaft 12 has cross channels 118 at its end for engaging the key formations 117. The key formations 120 at the opposite side of the key member 115 have considerable radial clearance within sector shaped end recesses 121 in the adjacent end of the holder member 110 so that the holder member may rotate through a considerable angle with reference to the shaft 12.

Seated in a suitable end bore 122 in the end of the holder 110 adjacent the tap is a hardened chuck element 124. The chuck element 124 may be held against rotation relative to the holder 110 by reason of a cross key 125 extending through the walls of the holder member 110 into a suitable slot 126 at the inner end of the chuck element 124. The chuck element 124 is provided with inwardly extending lugs or jaw formations 127, two being shown, see Fig. 7, which are embraced by arcuate slots formed in the end of the tap shank, as at 128. The side walls of the slots 128 abut the lugs 127 for driving engagement between the tap 129 and the element 124, and there is preferably considerable angular clearance between the two sets of lugs to facilitate tap engagement. A suitable end stop may be provided for the tap as by a removable plug-like member 130 threaded into the inner end of the element 124 between the cross key 125 and the end of the tap.

In order that upon engagement between the chuck element 124 and the tap substantially all the radial clearance between the key members 120 and the holder 110 will be utilized to delay the application of driving force necessary to turn the tap to cut threads, I provide a yielding connection between the holder 110 and the collar 102, which will normally hold the tap engaging parts in the desired position with reference to the spindle. Suppose the spindle is rotating clockwise as shown in Fig. 6, and the tap is picked up by the chuck device described, the key elements 120 should at such time be in their broken line position so that the tap will have time to completely enter into the embrace of the lugs 127 before the key elements 120 reach their full line positions. To hold this relation while the chuck is withdrawn from the tap, I provide a torsional spring 131 between the shaft 12 and the tap engaging portion of the chuck. As shown, there is a spring housing 132 fixed to the holder 110 as by means of a threaded pin 133, but which may turn freely with reference to the collar arrangement 102. The threaded pin 133, incidentally, is also employed as by seating in a recess 124a in the element 124 to hold this element 124 against longitudinal movement out of the holder 110.

Within the spring housing 132 is a circular space 134 which contains the spring 131, one end of the latter being connected as at 135 to the housing 132 and the other end being connected, as at 136, with the ring 105. The spring is so arranged that it tends to rotate the holder member 110 and the chuck element 124 with relation to the spindle and collar 102 in the tap driving direction, so as to hold the member 110 in turned position relative to the key 115 such that the key elements 120 thereof are in their broken line position, see Fig. 6.

It will be seen that when the tap is first engaged by the chuck member 124, the spring starts to wind up and the key elements 120 are carried to their full line position in Fig. 6, but this yielding force applied between the holder 110 and the spindle shaft is obviously insufficient to cause any wear between the chuck 124 and tap or to cause tap breakage. In the ordinary operation of the machine, there is time enough for the tap shank formations 128 and 129 to entirely enter into embracing relation to the lugs 127 of the chuck before all the radial clearance between the key elements 120 and the slots 121 is taken up.

Upon disengagement of the chuck in general from the tap, as by reason of the withdrawal of the spindle shaft by the cam 31 and associated mechanism, including the bar 40, there will be no unusual frictional resistance offered to withdrawing the chuck element 124 from the tap shank, since the adjacent driving surfaces will remain smooth due to the ease of engagement provided for by the mechanism described.

The modification shown in Figs. 8 to 11 is somewhat simplified and may be made lighter in weight. The collar arrangement 102′ has the integral shoulder at the opposite end from that shown in Fig. 4 and there is a removable ring 105′ arranged to engage the arm 104, this collar arrangement being held on by a split outwardly threaded ring 108′, seated in a peripheral channel in the spindle shaft as with the previously described modification.

The key 115′ is shown as cross slotted on one face as at 117′ and the end of the shaft 12′ has a similar slot, the two slots receiving a cross key 117" for holding the key member 115' against turning movement with relation to the shaft. The collar 102' bears directly on the end of the shaft 12'. The arrangement of the modification reduces the number of parts forming the assembly since there is a single tubular chuck member 110' provided with sector shape radial slots 121' for the reception of the comparatively narrow key projections 120' on the key element 115', which member 110' also directly engages the tap. The radial clearance between the parts 120' and the slots 121' may be substantially the same as before.

Practically the same torsional spring arrangement is provided as in the previously described construction, for taking up the clearance space in the proper direction, there being a housing 132' riding on the outwardly extending end of the chuck 110' and a torsional spring 131' arranged between the collar 102' and the spring housing. The chuck member 110' may have inwardly extending lugs designated 127' riding in slots 128' in the tap shank, there being again radial clearance between the lugs and the edges of the slots to further facilitate tap engagement. The chuck member 110' is provided with an abutment stop for the tap shank shown as a plug 130' held in place by a cross key 126'. The operation of the modified device is substantially the same as of that previously described.

I claim:

1. In mechanism of the kind described, a cutting tool adapted to perform work by rotary motion, a chuck adapted to intermittently, drivingly engage the tool, means for driving the chuck, and a yielding lost motion connection between the chuck and said driving means, whereby the period between actual engagement of the tool with the chuck and full driving engagement between these parts may allow such full driving engagement prior to imparting the rotational driving force of said first named means to the tool.

2. In mechanism of the kind described, a cutting tool adapted to perform a succession of operations on work, means to drive the tool including a shaft adapted to be continuously roated and a chuck carried on the shaft, means to relatively reciprocate chuck and tool to cause intermittent engagement therebetween, there being a resiliently opposed lost motion connection between the shaft and chuck to facilitate full engagement of the chuck and tool prior to operatively turning the tool.

3. In a tapping machine, a tap driving spindle and tap chuck thereon, means for reciprocating and rotating the spindle to cause it to periodically engage the tap and operatively turn the tap, there being connecting means between the spindle and chuck for supporting the chuck in alignment with the spindle, said means including a yielding lost motion device interposed between the chuck and spindle for permitting the chuck to turn on the spindle a limited distance prior to driving the tap to cut threads, whereby the tap may be fully engaged by the chuck before the actual thread cutting operation is begun.

4. In mechanism of the kind described, a tool adapted to perform work by rotary motion, spindle mechanism including a reciprocable chuck and a driving shaft therefor for turning the chuck, said chuck being arranged substantially complementary to one end of the tool whereby it may engage and turn the tool, a key interposed between said chuck and shaft and having a lost motion connection with one of the last mentioned elements, there being a torsional spring in connecting relation to the chuck and shaft and arranged to turn the chuck in the direction of turning of the shaft, whereby initial engagement between the tool and chuck will necessarily take up said lost motion before the chuck is driven positively by means of the key.

5. In a mechanism of the kind described, a spindle shaft, a chuck device including a plurality of axially aligned parts coaxial with the spindle, a tool, means for holding work for operation thereon by the tool, said tool being adapted to extend into the work and be supported thereby when disengaged from the chuck device, the tool having jaw formations and one of the parts of the chuck device having substantially complementary jaw formations, another of said parts of the device comprising a key in drivingly rigid relation to the spindle and having an angular lost motion connection with the element of the chuck which has the jaw formations, there being yielding means to normally hold the last mentioned element in a predetermined angular position with relation to the key to take up said lost motion in the direction of turning of the spindle shaft.

6. In a tool chuck, two chuck forming members, one supporting the other for rotation thereon and interposed means to limit such rotation, the supported member being adapted to engage and disengage a tool to drive and release the same, there being a spring surrounding one of said members and having its respective ends connected each to one of the members in such manner that the spring normally tends to hold the supported member turned relative to the other in the tool driving direction, whereby initial engagement of the supported member with the tool will cause such relative movement of the members in opposition to the restraining action of the spring.

7. In mechanism of the class described, a chuck element adapted to drivingly engage and disengage a tool, a shaft adapted to be driven, a connecting member between the shaft and said element, and means on the conecting member to guide and support the said element for limited turning movement relative to and coaxially with the connecting member, yielding means between the said element and the connecting member for normally maintaining these parts in a definite turned relation when the said element is disengaged from such tool, and a central supporting device extending in bridging relation to the connecting member and shaft and forming a pilot bearing therebetween to hold the axial relationship of the said element and shaft.

8. In a metal cutting machine, a tool and work support therefor, a driving shaft for the tool arranged to be continuously rotated and periodically reciprocated relative to the work in order to engage and turn as well as disengage the tool, a chuck device mounted on the end of the shaft adjacent the tool and comprising a plurality of tubular parts, one embracing the end of the shaft and another having a rotational guide in the first, said other having a socket to engage and turn the tool, there being a key device arranged to afford an angular lost motion connection between the said other element which has the socket, and the shaft, a spring housing supported on said other element in embracing relation thereto and a torsional spring housed thereby and connected at its ends with the two said elements respectively, whereby said two elements will be maintained in a predetermined relatively rotated position, and whereby the initial engagement of the socketed element with the tool will be inoperative to drive the tool.

9. In a metal cutting machine of the class described, a tool having a driving shank, a chuck member interiorly recessed substantially complementary to the shank, means for driving the chuck member and means to facilitate engagement between the chuck and shank including a resiliently biased lost motion connection between said chuck member and said driving means.

10. In an automatic tapping machine, a driving spindle, and a driving head associated therewith, a chuck adapted to freely engage a tap, the chuck being supported by said head and arranged to turn relative thereto through a predetermined angle, there being resilient means between the chuck and said head arranged to take up lost motion between the head and chuck in a rotational direction identical with the rotational movement of the spindle to drive the tap, whereby there will be an interval of time between the actual contact between the tap and chuck and the application of positive driving force to turn the tap.

11. In an automatic tapping machine, wherein the tap remains in the embrace of work while the tapped pieces of work are discharged over the tap shank, a shaft adapted to be continuously rotated, a chuck associated with the shaft and adapted to intermittently engage the tap shank to rotate the same, said chuck comprising two members in axial alignment with the shaft, one member being adapted to make a lost motion connection with the shank of the tap, the other member being adapted to make a lost motion connection with the shaft and a direct driving connection between the two members.

12. In an automatic tapping machine wherein the tap remains in the embrace of work while the tapped pieces of work are discharged over the tap shank, a shaft adapted to be continuously rotated, a sleeve in threaded engagement with the shaft, a chuck holder in axial alignment with the end of the shaft, a key member between the end of the shaft and the chuck holder, said key member being adapted to make a lost motion connection between the shaft and said chuck holder, a torsional spring surrounding said chuck holder and adapted to turn the chuck holder in the direction of turning of the shaft, the chuck holder having a cavity in the end opposite the shaft, a chuck element within said cavity and a key between the chuck holder and chuck element.

13. In an automatic tapping machine, wherein the tap remains in the embrace of work while the tapped pieces of work are discharged over the tap shank, a shaft adapted to be continuously rotated, a sleeve surrounding said shaft and being in threaded engagement therewith, said sleeve extending out beyond the ends of the shaft, a chuck holder in axial alignment with the end of the shaft, a ring surrounding said chuck holder in threaded engagement with said sleeve, said ring being adapted to assist in holding the chuck holder in position, there being means to make a lost motion connection between the chuck holder and the shaft, a torsional spring surrounding said chuck holder, said spring being in connected relation with said ring and the chuck holder, and being arranged to turn the chuck holder in the direction of turning of the shaft, a chuck in axial alignment with said chuck holder, there being a direct driving connection between said chuck and chuck holder.

In testimony whereof, I hereunto affix my signature.

BERNARD P. SCHILTZ.